United States Patent Office 2,998,574
Patented Aug. 29, 1961

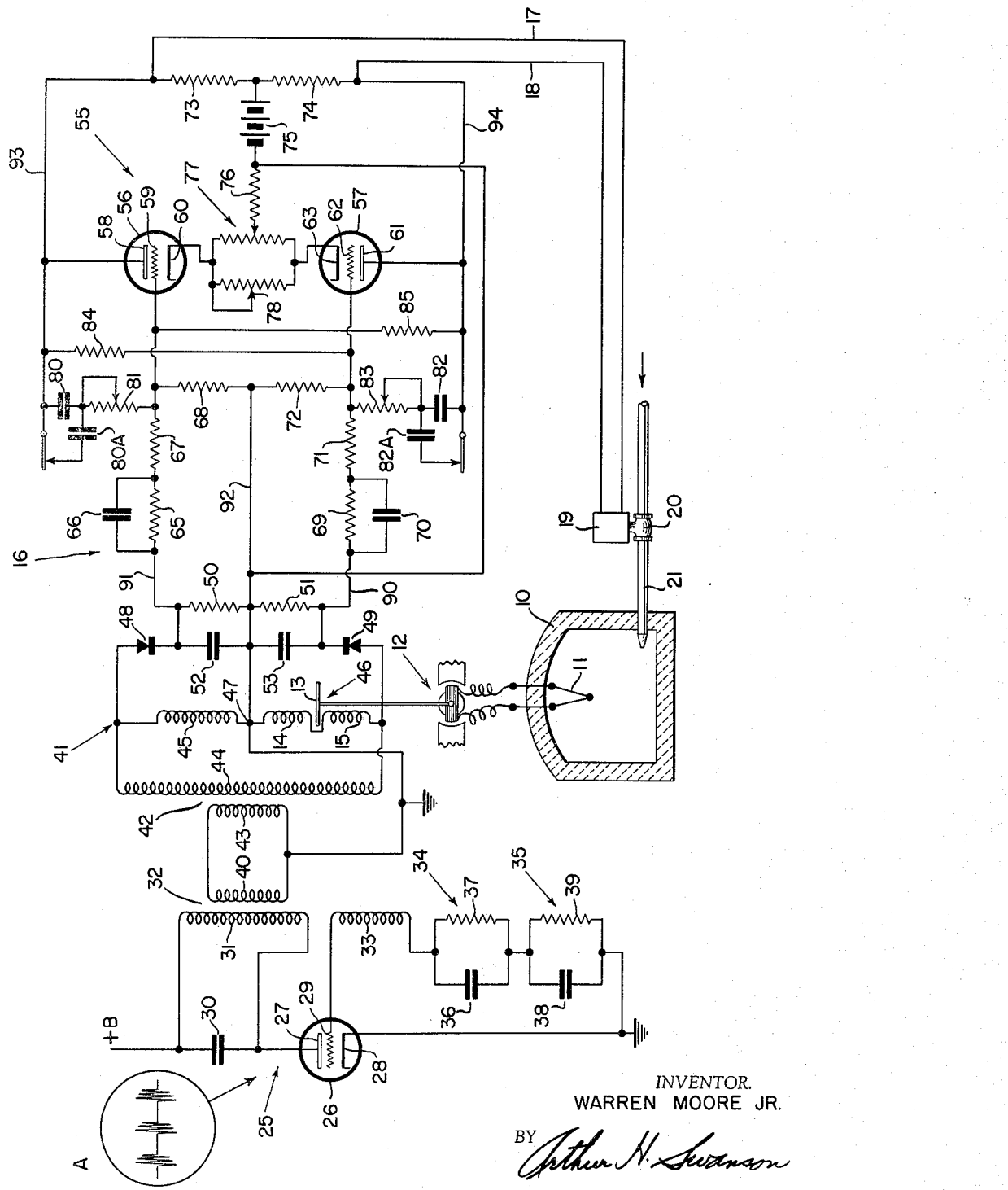

2,998,574
OSCILLATOR CIRCUIT HAVING MEANS TO CYCLICALLY PRODUCE HIGH FREQUENCY PULSES
Warren Moore, Jr., North Hills, Pa., assignor to Minneapolis-Honeywell Regulator Company, Minneapolis, Minn., a corporation of Delaware
Original application Nov. 28, 1952, Ser. No. 323,069, now Patent No. 2,868,458, dated Jan. 13, 1959. Divided and this application Apr. 17, 1958, Ser. No. 729,160
2 Claims. (Cl. 331—65)

This application is a division of my copending application Serial No. 323,069, filed November 28, 1952, Patent No. 2,868,458, issued Jan. 13, 1959, entitled Electrical Control Apparatus.

A general object of the present invention is to provide a new and improved electrical controller which will respond to minute changes in a variable and produce an electrical output signal which may be used to control the variable. More specifically, the present invention is concerned with a galvanometer positioned vane which changes an electrical characteristic of an electrical circuit. The changes are detected and amplified to produce an output control signal which is dependent upon the position of the vane.

In present day process control problems, it is frequently necessary to provide controllers which will follow very small changes in the variable of the process so that corrective action can be taken to hold the variable at its desired value. Such controllers may also require rate and resetting operation in order to hold the variable at its desired position. In designing such controllers, care must be taken to see that the operation of the controller does not affect the variable sensing unit except as it may change the variable. In addition, the controller must accurately follow changes in the variable and produce an output control signal which will eliminate prolonged deviations of the variable from its desired value. In addition, such apparatus must have easily made proportional band and centering adjustments.

It is accordingly a further object to provide a new and improved electrical controller which is characterized by its large response to minute input signals.

Another object of the present invention is to provide an electrical controller which will produce a direct current signal which will follow an input signal of a variable and when amplified will be a control signal for maintaining the variable at a desired value.

Still another object is to provide an electrical controller having a variable positioned galvanometer which positions a vane in an electrical circuit and the vane is not appreciably loaded by the electrical circuit.

A still further object is to provide an electrical controller for producing a direct current which varies in magnitude and polarity with variations in a variable where the direct current signal is amplified with rate and reset components added thereto.

Another object of the present invention is the provision of a direct current controller having an amplifier with internal resetting apparatus for producing a varying output signal with a continued input error signal.

The various features of novelty which characterize the invention are pointed out with particularity in the claims annexed hereto and forming a part of this specification. For a better understanding of the invention, however, its advantages, and specific objects obtained with its use, reference should be had to the accompanying drawings and descriptive matter in which is illustrated and described a preferred embodiment of the invention.

The single figure of the drawing shows schematically one manner in which the preferred embodiment of the invention may be arranged.

Referring now to this single figure, the numeral 10 represents a furnace wherein a variable, such as temperature, is to be maintained at a desired value. For detecting the magnitude of the variable there is provided a thermocouple 11 which is connected to a suitable galvanometer assembly 12. This galvanometer 12 positions a vane 13 relative to a pair of coils 14 and 15 in the electrical controller 16 which forms the basic part of the present invention. The output of the controller 16 is upon a pair of electrical leads 17 and 18 and the signal on these leads will operate upon a controller 19 which will position a suitable valve 20 which may regulate the flow of fuel through a conduit 21 to the furnace 10. The flow of the fluid through the conduit 21 will be regulated so as to maintain the temperature within the furnace at a desired value. While the apparatus is shown controlling temperature, it is to be understood that any desired variable, such as flow, pressure, and the like may be controlled.

Referring more specifically to the controller 16, the source of energy for the control signal is derived from an oscillator section 25. Included in this oscillator section is a three electrode electronic device 26 having an anode 27, a cathode 28, and a control electrode 29. Connected in the anode circuit of the device 26 is a condenser 30 which is arranged to resonate with a coil 31 which is the primary winding of a transformer 32. Coupled to the coil 31 is an input coil 33 which has one end thereof connected to the control electrode 29. Connected to the other end of the coil 33 are a pair of parallel connected R.C. circuits 34 and 35. The circuit 34 comprises a condenser 36 connected in parallel with a resistor 37 while the network 35 comprises a condenser 38 connected in parallel with a resistor 39. This oscillator 25 is characterized by its oscillating at a high frequency for short intervals with a delay between operations so that there is in effect a number of high frequency pulses appearing across the transformer 32.

An output winding 40 on the output of transformer 32 serves to couple the output of the oscillator section 25 to the input of a variable detector section 41. This input comprises a transformer 42 connected to the winding 40 by a primary winding 43 and a secondary winding 44. The secondary winding 44 is arranged for connection to the ends of a pair of coils 45 and 46, the latter of which is comprised of the two coil sections 14 and 15 as set forth above. The coils 45 and 46 form a type of voltage divider across the secondary 44 and, by reason of the output tap 47, there is an apparent bridge type of network which may be unbalanced depending upon the relative magnitudes of the coils 45 and 46.

Also included in the variable detector section 41 are a pair of assymmetrically conducting devices 48 and 49 which are shown in the drawing as conventional rectifiers. Associated with the output of the rectifier 48 is a resistor 50 while associated with the output of the rectifier 49 is a resistor 51. A condenser 52 cooperates with the resistor 50 as a filter condenser as does the condenser 53 relative to the resistor 51.

The output of this detector section will be in the form of a direct current signal whose polarity and magnitude will be directly dependent upon the magnitude of the variable originating from the furnace 10.

Connected to the resistors 50 and 51 is the amplifier portion of the present apparatus indicated by the numeral 55. The amplifier portion includes a pair of control electrode controlled electronic devices 56 and 57 which are differentially connected to the resistors 50 and 51. The electronic device 56 comprises an anode 58, a control electrode 59, and a cathode 60 while the device 57 comprises an anode 61, a control electrode 62, and a cathode 63.

The input to the device 57 comprises a rate circuit in the form of a resistor 65 having a condenser 66 connected in parallel therewith. Also included is a further pair of resistors 67 and 68.

Associated with the input of the electronic device 57 is a further rate network comprising a resistor 69 having a condenser 70 connected in parallel therewith and a pair of resistors 71 and 72.

The output of the electronic device 56 comprises a resistor 73 while the output of the electronic device 57 includes a resistor 74. For supplying energy to both of the electronic devices there is provided a battery 75 connected to the junction between the resistor 73 and 74 at one end and at the other end connected to a resistor 76. Connected between the cathodes of the devices 56 and 57 is a potentiometer 77 which acts to balance the current flows through the two devices and a rheostat 78 which may be used to adjust the gain of the amplifier to a high value. If the negative feedback circuits, not yet set out, are not used, the rheostat 78 acts as a proportional band adjustment.

A pair of feedback circuits are provided for each of the electronic devices with negative feedback for the electronic device 56 being provided by a condenser 80 connected in series with an adjustable resistor 81 between the anode 58 and the control electrode 59. In the electronic device 57, the negative feedback path is through a condenser 82 connected in series with an adjustable resistor 83. This negative feedback circuit is between the anode 61 and the control electrode 62. An additional pair of condensers 80A and 82A may be connected in parallel with the condensers 80 and 82 by suitable switches to vary the reset rate of the apparatus. Positive feedback is obtained in the amplifier section 55 by a connection from the anode 58 through a resistor 84 to the control electrode 62 as well as a connection from the anode 61 through a resistor 85 to the control electrode 59. This cross connected positive feedback will be explained in the course of the explanation of the operation of the apparatus.

Considering the operation of the present apparatus, attention should first be directed to the operation of the oscillator section 25. Electrical components of the networks 30 and 35 are selected so that the R.C. time constant of the network 34 is relatively long. At the time of initial adjustment, the network 35 will be shorted out and network 34 tuned so as to give a desired stable level of operation. With the time constant of the network 35 selected to be relatively long, the oscillator will oscillate at a high frequency in pulses of relatively short duration. At the start of each pulse, the oscillator goes rapidly into an intense oscillatory condition with the operation being class C as far as the device 26 is concerned. The intensity is limited by the short time constant network 34. With the class C operation, there will be control electrode current flow which will tend to slowly change the condenser 38. This slow change will cause a decrease in the oscillatory intensity due to the negative biasing action of the change on the condenser 38 until the section goes out of oscillation. This is shown in the insert A on the drawings. Such an oscillator as this minimizes the side band frequencies which will be present in the detector section as well as the loading effect on the vane 13, as will be hereinafter explained.

Representative data on the oscillator section 25 is as follows:

| | |
|---|---|
| Device 26 | 12AU7. |
| Condenser 36 | 47 micro microfarads. |
| Condenser 38 | .5 microfarads. |
| Resistor 37 | 1000. |
| Resistor 39 | 470K. |
| Oscillation frequency | 20.5 mc. per second. |
| Pulsing rate | 3 per second. |

The output of the oscillator is coupled to the detector 41 by the coupling link 40—43 and this coupling link is arranged so there will be no capacitive coupling into the transformer 42 from the oscillator section 25.

The pulses of energy from the oscillator section 25 are applied across the winding 44 and the coils 45 and 46. Inasmuch as the vane 13 is arranged for positioning between the coil sections 14 and 15, should the oscillations be continuous, there is a tendency for the coils to load and force the vane from its normal position against the operating forces from the galvanometer coil. This is due to circulating currents being induced in the core which currents act in the field of the coils to move the vane away from the coils. This loading of the vane may be sufficient to render ineffective the input control action of the galvanometer coil and thus render the apparatus effectively useless. By providing only short pulses of energy, this loading of the vane by the coil sections 14 and 15 is reduced to a minimum.

As the voltage drop across the coils 45 and 46 is dependent upon the frequency applied, it is essential for stable operation that the side band frequencies be at a minimum. Such is obtained from an oscillator of the present type. It was found that when network 34 was omitted the output of the bridge circuit 41 was smaller for a given unbalance and balance point of the bridge was less sharp than when the network was present. It was believed that this was due to the sharpness of the pulses leading to a broad frequency spectrum being applied to the bridge 41 and also an extremely low duty factor. This low duty factor, which is the pulse length relative to the total cycle, is selected to be a compromise between minimum loading of the vane and maximum output from the section 41.

With the variable in the furnace 10 being at the desired value, and assuming that this value will produce a vane position wherein the vane 13 is halfway between the coils 14 and 15, the impedances of the coils 45 and 46 should be substantially the same so that the relative voltage drops thereacross due to the input signal applied to their ends will be substantially the same. The voltages appearing across the coils 45 will be rectified by the rectifier 48 and there will appear upon the resistor 50 a direct current voltage which is filtered by the action of the condenser 52. The voltage across the coil 46 will be rectified by the rectifier 49 and this will produce a direct current voltage across the resistor 51 which will be filtered by the condenser 53. If there is a balanced condition, the voltage across the resistor 50 will be equal to the voltage across the resistor 51. Under such circumstances, with the polarities at the rectifier ends being the same, there will be zero net voltage across the two resistors applied to the input of the amplifier section 55.

Should the variable within the furnace 10 change so that the vane 13 is moved out from between the coils 14 and 15 the inductance of the coil 46 will increase and this increase will cause there to be a larger voltage drop across the coil 46. This will appear across the output resistor 51 as a larger direct current voltage so that the net voltage across the two resistors 50 and 51 will be such that the conductor 90 will be positive with respect to the conductor 91. Should the voltage within the furnace 10 be reversed, the galvanometer will move the vane 13 between the coils 14 and 15 so as to decrease the amount of inductance. This will mean that there will be a decrease across the coil 46 and a resultant decrease in voltage across the resistor 51. The net voltage on the conductors 90 and 91 will be such that the conductor 91 will now be positive with respect to the conductor 90.

It will thus be seen that section 41 will produce a direct current signal whose polarity and magnitude in the output conductors 90 and 91 will be dependent on the magnitude of the variable within the furnace 10. This direct current signal will then be amplified by amplifier section 55.

The input circuit leading to the devices 56 and 57 includes a rate network which has the effect of producing a voltage proportional to the rate of change of the direct current signal on the resistors 50 and 51. The input circuit for the electronic device 59 may be traced from conductor 91 through the resistor 65, resistor 67, resistor 68 and conductor 92 back to the resistor 50. In the event that the condenser 66 is not connected across the resistor 65, appearing across the resistor 68 on the electronic device 56 will be that portion of the input signal divided by the resistors 65, 67 and 68. However, with condenser 66 connected across the resistor 65, this shorts out the resistor 65 during changes of the signal so that the signal is now divided across the resistors 67 and 68. In that arrangement, the condenser 66 when connected across the resistor 65 will introduce to the input a derivative action of the control signal appearing across the resistor 50. After the input signal has stabilized, the input voltage across the resistor 65 will have stabilized to its normal value and the condenser 66 will have been charged to that value. The operation of the resistor 69 and the condenser 70 on the input of the electronic device 57 is the same as that on the input of the electronic device 56.

The net signal on the control electrode 59 will be the voltage drop across the resistor 68. This will mean that there will appear across the resistor 73 on the output of the device 56 an amplified voltage. The same will be true across the resistor 74 in the output of the electronic device 57. The electron current flow through the device 56 may be traced from the cathode 60, anode 58, conductor 93, resistor 73, battery 75, resistor 76, potentiometer 77, back to cathode 60.

The electron current flow circuit for the device 57 may be traced from the cathode 63 to the anode 61, conductor 94, resistor 74, battery 75, and resistor 76 through potentiometer slide wire 77 to the cathode 63. This will result in their appearing across the resistor 73, and 74, as well as the output conductors 17 and 18, a direct current signal which will be proportional to the signal on resistors 50 and 51. With the condensers 66 and 70 in the circuit, there will be superimposed thereon a derivative signal which will tend to prevent hunting or overshooting of the variable in the furnace 10 and will cause the variable to assume its desired value.

Consider now the operation of the feedback circuits in the amplifier section 55. Positive feedback is obtained in the apparatus by a connection from the anode 58 through the resistor 84 to the control electrode 62 as well as through the resistor 85 connected between the anode 61 and the control electrode 59. Thus, when the control electrode 59 becomes more positive, the feedback through resistor 84 will become negative and this negative signal will be applied through the resistor 84 to make the control electrode 62 more negative. With the control electrode 62 becoming negative, the anode 61 will become positive and this positive potential will be applied through the resistor 85 to the control electrode 59 to increase further the positive potential on the control electrode. In the absence of some further feedback the amplifier section would tend to have infinite gain, but with the actual gain being limited by the saturating characteristics of the electronic device 57. This runaway characteristic is prevented by the negative feedback network in electronic device 56 in the form of the condenser 80 connected in series with the resistor 81. The initial effect of the negative feedback circuit on the control electrode 59 is to produce a voltage counter the positive feedback voltage derived from anode 61. Thus, with a step input signal, the control electrode 59 will be aware only of the difference between the positive feedback signal and the negative feedback signal. Likewise, the negative feedback circuit for the electronic device 57 is a condenser 82 connected in series with a resistor 83. As before, the negative feedback action, on a step input, may be partially balanced by the positive feedback from the anode, so that only the difference appears on the control electrode 62.

In the event that the control variable should deviate from the desired value continuously so that there is a continuous signal on the conductors 90 and 91, it is desired that a resetting action take place so as to gradually eliminate this deviation.

This resetting or integrating action is obtained by the condenser 80 slowly charging and slowly removing a portion of the negative feedback to the control electrode 59. The resetting action for the electronic device 57 is obtained by the condenser 82 gradually charging to remove some of the negative feedback of control electrode 62. The only way this circuit can maintain a balance is for the amplifier devices to increase their output voltage so as to counteract the charging of the respective condensers. This slow increase in the maintaining of a stable condition on the inputs of the electronic devices 56 and 57 produces a control signal on the conductors 17 and 18 which will be gradually increasing. This gradual increase will cause the controller 19 to regulate the valve 20 gradually changing the flow of fuel to the furnace 10 to remove the unbalanced condition in the furnace. Due to the long time constants of the discharging circuits for the condensers 80 and 82, the change level will tend to hold over a period of time and there is thus obtained a reset action which has the effect of eliminating any deviations in the furnace 10. With the present arrangement, the apparatus is arranged to have maximum gain with accompanying stability even with rate and reset superimposed upon the basic control signal. While the apparatus can be operated satisfactorily with only one side including rate and resetting components, the operation is greatly enhanced by the presence of the double rate and reset circuit configuration.

To change the proportional band of the apparatus, the adjustable resistors 81 and 83 may be adjusted with the adjustment having the effect of changing the feedback to the electronic devices 56 and 57. To effect a balance between the current flows in the devices 56 and 57, there is provided the potentiometer 77 which may be adjusted to give a desired balanced output when the input from the detector section 41 indicates a balance, or with no input to the amplifier section 55.

While in accordance with the provisions of the statutes, there has been illustrated and described the best forms of the invention known to me, it will be apparent to those skilled in the art that changes may be made in the form of the apparatus without departing from the spirit of the invention as set forth in the appended claims, and that in some cases certain features of the invention may be used to advantage without the use of other corresponding features.

What is claimed is:

1. In an electrical controller for producing an output signal proportional to the positioning of an element in an electrical circuit, the combination comprising, an electrical oscillator section for producing a train of high frequency pulses, said section comprising an electronic device having an anode, cathode, and control electrode, a tuned tank circuit connected to said anode, a coupling coil coupled to said tank circuit connected between said control electrode and said cathode, and a pair of R.C. circuits serially connected in said last named connection, said R.C. circuits being arranged to cause said oscillator to cyclically produce short high frequency pulses.

2. An oscillator for an electrical controller comprising, an electronic device having an anode, cathode, and control electrode, a tuned resonant high frequency tank circuit connected to said anode, a coil inductively coupled to said tank circuit and connected between said control electrode and said cathode, and a pair of R.C. circuits serially connected in said last named connection, one of said pair having a relatively short time constant and the other having a relatively long time constant so that said oscillator will cyclically operate for short periods at a relatively steady intensity.

References Cited in the file of this patent
UNITED STATES PATENTS

| | | |
|---|---|---|
| 2,426,021 | Hausz et al. | Aug. 19, 1947 |
| 2,437,970 | Reich | Mar. 16, 1948 |
| 2,544,741 | Varela | Mar. 13, 1951 |